(No Model.)

J. STORER & B. T. LACY.
METHOD OF AND APPARATUS FOR DISSOLVING, LEACHING, AND FILTERING.

No. 525,970. Patented Sept. 11, 1894.

Witnesses,

Inventors,
John Storer
Benjamin T. Lacy.
By Dewey & Co.,
Attys

UNITED STATES PATENT OFFICE.

JOHN STORER, OF SYDNEY, NEW SOUTH WALES, AND BENJAMIN THOMAS LACY, OF SAN FRANCISCO, CALIFORNIA.

METHOD OF AND APPARATUS FOR DISSOLVING, LEACHING, AND FILTERING.

SPECIFICATION forming part of Letters Patent No. 525,970, dated September 11, 1894.

Application filed November 1, 1893. Serial No. 489,710. (No model.)

*To all whom it may concern:*

Be it known that we, JOHN STORER, consulting chemist, a subject of the Queen of Great Britain, residing at Sydney, in the British Colony of New South Wales, and BENJAMIN THOMAS LACY, mining engineer, a citizen of the United States, residing at San Francisco, California, one of the United States of America, have jointly invented a new and useful invention to be Used as an Improved Method of and Apparatus for Dissolving, Leaching, and Filtering, of which the following is a specification.

This invention relates to an improved method of and apparatus for dissolving, leaching and filtering various substances or mixtures as for instance in the treatment of ores and minerals for the extraction of their metal contents by "wet methods," in the production of chemical substances, in the treatment of the refuse of industrial works, in the treatment of sewage and in other treatments of other materials or mixtures requiring to be dissolved, leached or filtered. By this invention economy in working and greater speed are effected in the solution, leaching and filtration of all substances or materials requiring to be so treated or to separately undergo each such process.

This improved method of dissolving, leaching and filtering consists in the forced circulation in closed vessels by means of direct steam or gaseous pressure of the solvent or leaching liquid or material to be filtered as the case may be and the improved apparatus consists of specially devised closed vessels and of special combinations and arrangements of said vessels with valves and connections by means of which such method may be carried into practical effect; but in order that this invention may be clearly understood reference will now be made to the drawings herewith, in which—

Figure 1:
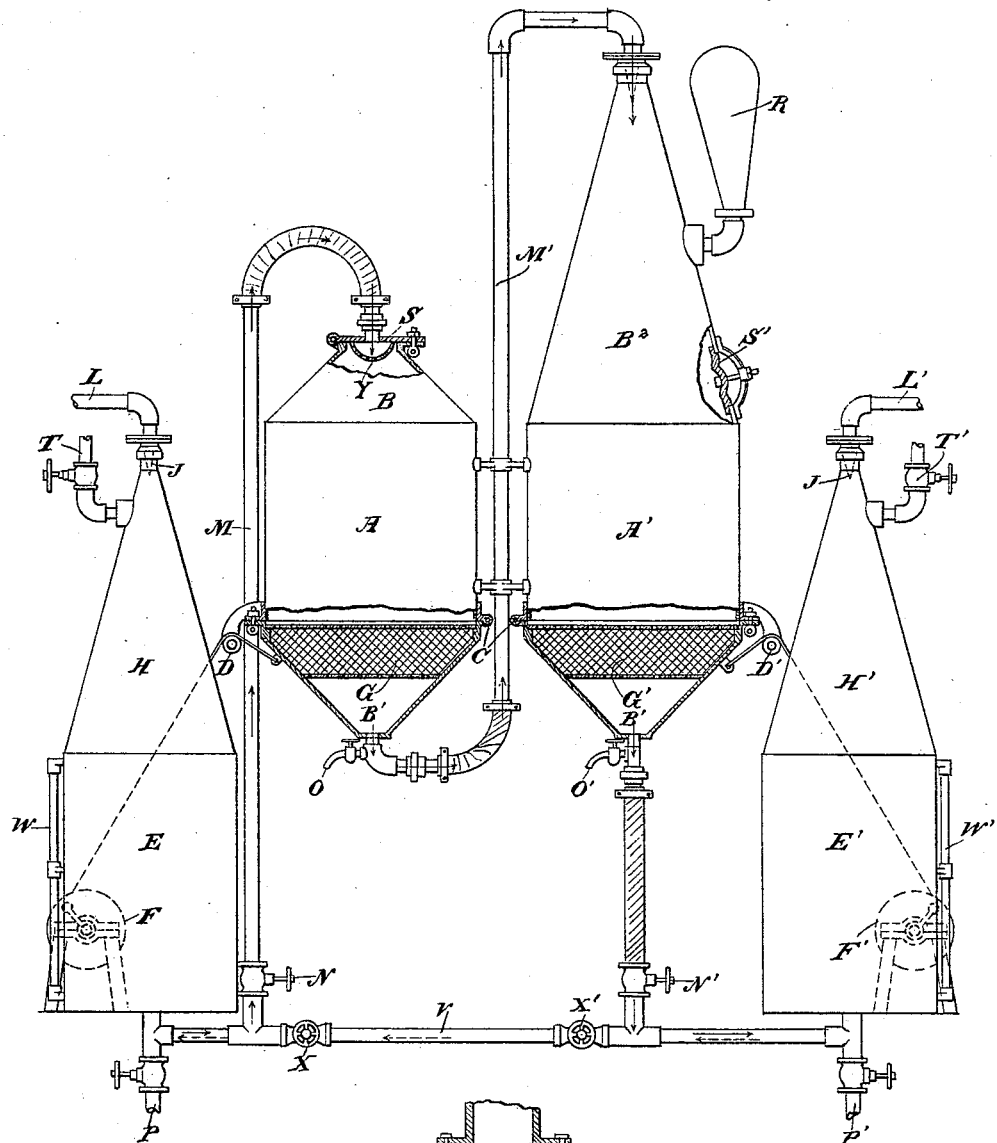
Figure 2:
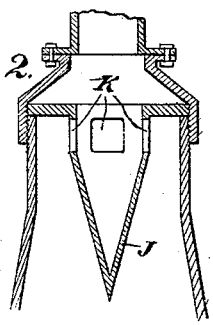

Figure 1 is an elevation partly in section of an improved apparatus for carrying out the improved method or process of dissolving, leaching and filtering, and Fig. 2 an enlarged sectional elevation of a steam distributer.

A A' are vessels or tanks into which the material to be operated on is charged. Each tank is preferably cylindrical with ends B B' B² tapered as shown. These ends like the body of the tanks are flanged and fixed to the body in any convenient way. The bottoms B' are hinged at C to permit of easy emptying. For that purpose the bottoms are lowered by chains worked over pulleys D D' from the winches F F' or from other suitable hoisting and lowering gear. After emptying the bottoms are hoisted back into position and bolted. They are then ready for a fresh charge. Fixed near the top of the ends B' are false bottoms G G' such as are used in lixiviation or filtering prepared as is customary and covered with any desired cloth, sacking or other suitable filtering medium.

E E' are cylindrical vessels or tanks fitted with tops H H' preferably tapering seventy-five degrees (75°) from the horizontal as shown.

It is to be understood that one or more perforated plates might be used to act also as distributers of steam over the surface of the contents of the tanks. These may be fitted or rest upon internal flanges on the inner periphery of said tanks in any desired positions. An inverted cone J (shown enlarged in Fig. 2) having also preferably a taper of seventy-five degrees (75°) as above is fitted at the top of each tank H H'. Each cone serves in conjunction with the tops H H' as a "distributer" and equalizer of the steam pressure upon the surface of the liquid contents of the tanks E E'. Steam is admitted into the "distributer" from the steam pipes L L' and thence passed through inlets K (say three equidistant from one another) into the tanks. The taper of seventy-five degrees (75°) from the horizontal is that which in practice has been found to produce the best and most economical working results although we do not confine ourselves to that exact angle.

By using steam direct from a steam boiler the arrangement detailed above is found to work in such a manner that whatever the steam pressure from the steam boiler employed may be, a working equivalent result is obtained in the tanks E E' and therefrom by the connecting pipes M M' to the tanks A A'. This pressure on the tanks upon the dissolving, leaching or filtering liquid with which the tanks E and E' are nearly filled forces said liquid into circulation as directed by the regulation or adjustment of cocks or valves as herein set out. In the ordinary process the liquid passes from tank E into tank A, thence into tank A' and finally into tank E'. From there by closing valves or cocks N N' and opening valves or cocks X X' the liquid by turning on the steam pressure from pipe L' is forced through pipe V into tank E from which (cocks X X' being closed and cocks N N' opened) it again is forced through the circuit before detailed as often as may be wished and until the desired result is obtained. The full line arrows show the course of the liquid through tanks E A A' to tank E' while the dotted arrows show its course from tank E' to tank E.

O O' are drain taps to drain off solutions from the ends B' before emptying the solid contents which may be in tanks A A'.

From tanks E and E' or either of them by means of steam pressure applied as before described the liquid may be forced through pipes P and P' or one of them as the case may be to where desired for subsequent treatment.

S S' are charging manholes.

T T' are pipes through which tanks E and E' are filled. They may also be used as steam escape pipes.

W W' are gage glasses to show levels of liquid.

We do not confine ourselves to any one special material in the construction of the before described apparatus as the material employed in the construction may be suited to the character of the solution or solutions used or the operations to be performed; for example iron may be used alone or lined with any material not appreciably acted on by the solution employed.

In the drawings an air vessel R is shown which may be fitted if and as desired and a spreader Y may also be fitted into tanks of the style of A if wished. Tank A' is shown with a tapered top $B^2$ similar to tops H and H' which construction of tank is especially suitable for a type of apparatus in which it is desired to have only one tank to which the steam pressure may be applied directly; but other apparatus may if desired have several tanks similar to tank A with top $B^2$ worked in series.

It can easily be seen that working as explained various combinations of parts may be arranged to fit varying conditions. Where washing is required the same procedure as with dissolving solutions is employed. If solutions or liquids containing insoluble or suspended matters require filtering they may be filtered directly through filter beds G G', the solutions or liquids being forced through from tank E.

We would have it understood that though we have described our method and apparatus as carried out by means of steam pressure that they may be operated with compressed air or other suitable expansible gas or vapor capable of giving the required pressure to act upon the non-compressible fluids.

Having now particularly described and explained the nature of our said invention and in what manner the same is to be performed, we declare that what we claim is—

1. The method herein described of dissolving, leaching and filtering, consisting, essentially, in admitting steam, gas or vapor under pressure into a vessel containing a non-compressible fluid; then forcing said fluid through the material to be treated, and finally admitting a forced pressure to said fluid in its circulation to return it to its initial tank.

2. The improved method of dissolving, leaching and filtering, consisting, essentially, in connecting a plurality of closed tanks in series, then introducing an expansible medium upon a body of non-compressible fluid contained in a terminal tank to force the said fluid under pressure into the successive tanks and through the material under treatment until it reaches the final tank, then connecting this last named tank with the initial tank, and finally introducing pressure in the said final tank to force the fluid therefrom so that it may be returned to said initial tank.

3. In an apparatus for dissolving, leaching and filtering, the combination of a tank or vessel for the material to be treated, said tank having a tapered upper end provided with a perforated distributer, a second tank adapted to contain a non-compressible fluid and having its upper end connected with a source of steam, gas or vapor supply, a pipe leading from the base of the fluid-containing tank to the other tank above the distributer, and means for connecting the base of the first named tank with the base of the fluid tank whereby the expelled fluid is returned to its tank.

4. In an apparatus for dissolving, leaching and filtering, the tank or vessel adapted to contain the material to be treated, and having a tapered end, in combination with a second tank or vessel connected with the first named tank and also with a source of pressure, said second tank adapted to contain the dissolving, leaching and filtering fluid, and a pressure distributer in the form of a perforated inverted cone, fitted in the upper tapered end of the tanks and provided with outlet openings, substantially as herein described.

5. In an apparatus for dissolving, leaching and filtering, a tank or vessel for the material to be treated, and a second tank connected therewith and containing a non-compressible fluid adapted to be forced, under pressure, through said material, and an inverted foraminous conical pressure distributer in the receiving end of the material-containing tank or vessel.

6. In an apparatus for dissolving, leaching and filtering, the combination of the tank adapted to contain the material to be treated, a tank adapted to contain a non-compressible fluid and connected with a source of steam, gas or vapor supply, a valve-controlled pipe from said fluid tank to said material-containing tank, a final tank beyond the material-containing tank, a valve-controlled pipe connecting said material-containing tank with said final tank whereby the fluid is forced into said final tank, a valve-controlled pipe connecting said final tank with the initial fluid tank, and means for admitting an expansive medium into said final tank to force the fluid therefrom back into the initial tank.

7. In an apparatus for dissolving, leaching and filtering, the combination of the tanks A and A' and means for connecting them, said tanks having their upper receiving ends tapered, and their lower ends provided with bottoms connected with means for opening and closing them, and perforated pressure distributers fixed in the upper ends of the tanks.

JOHN STORER.
BENJAMIN THOMAS LACY.

Witnesses as to the signature of John Storer:
FRED WALSH,
*Fel. Aust. Inst. P. A., Sydney, N. S. W.*
THOMAS JAMES WARD.

Witnesses as to the signature of Benjamin Thomas Lacy:
F. O. HARRON,
THOS. RICKARD.